April 10, 1928.  
G. E. WEBB  
ROTARY DISCHARGE CHUTE  
Filed March 27, 1926  
1,665,518  
3 Sheets-Sheet 1
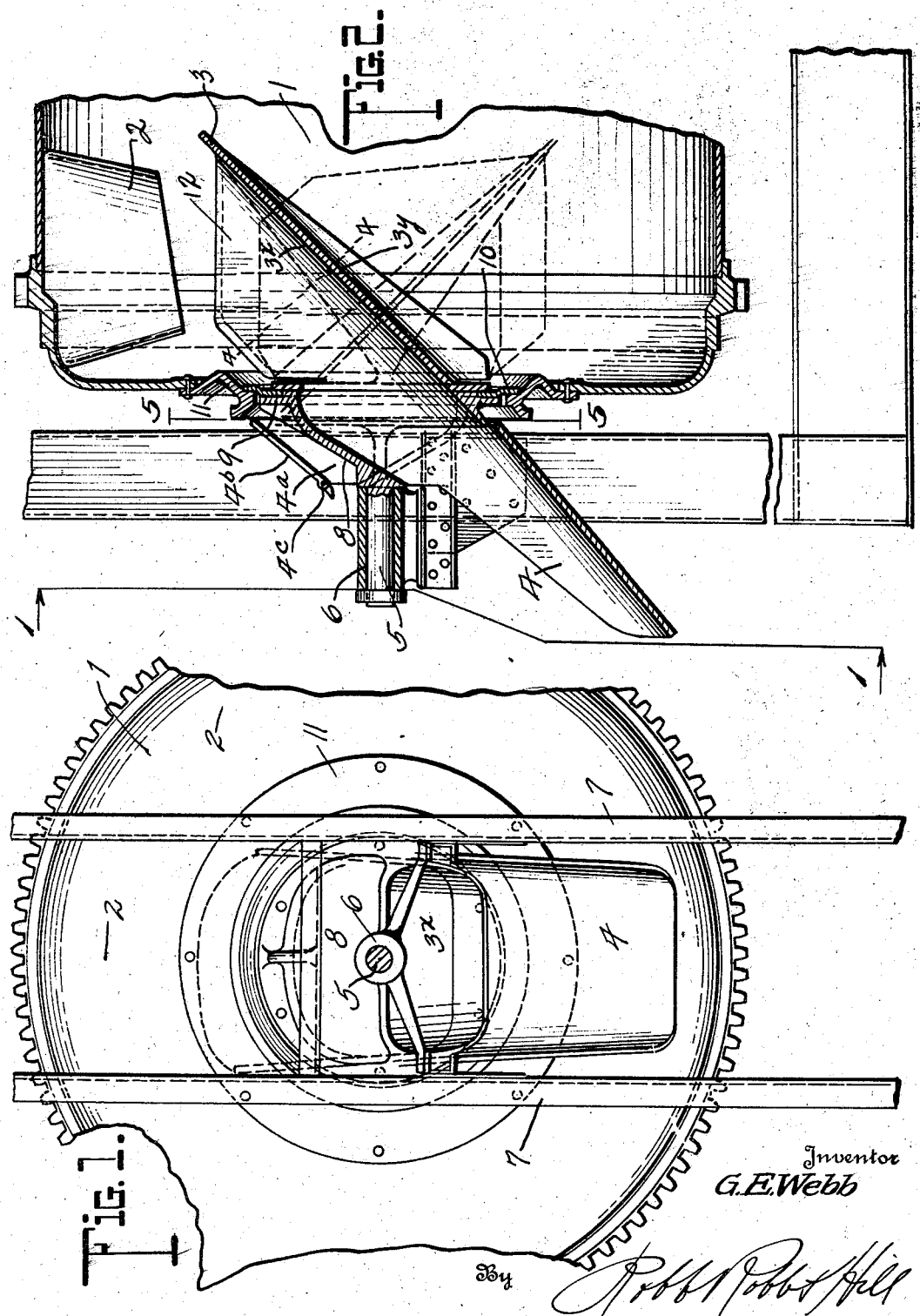
Inventor  
G.E.Webb  
By  
Attorneys

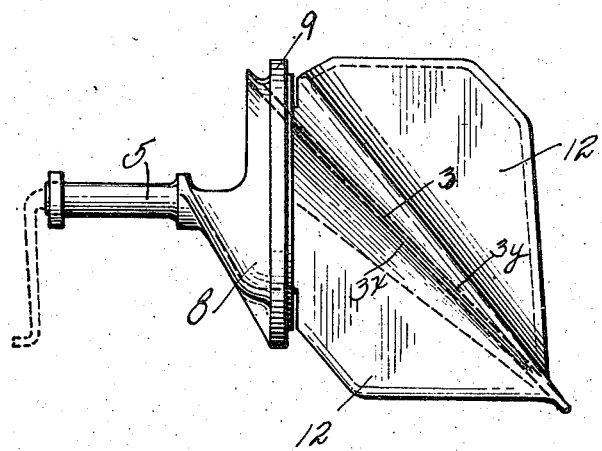
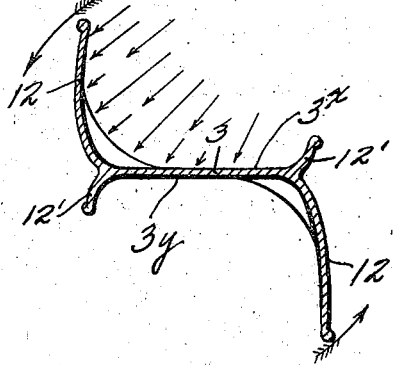
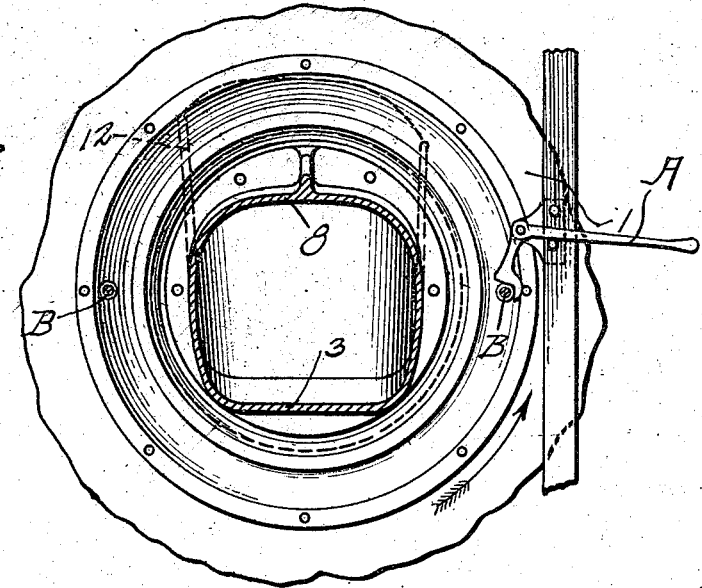

April 10, 1928.  1,665,518

G. E. WEBB
ROTARY DISCHARGE CHUTE
Filed March 27, 1926  3 Sheets-Sheet 3

Inventor
G. E. Webb

Attorneys

Patented Apr. 10, 1928.

1,665,518

UNITED STATES PATENT OFFICE.

GEORGE E. WEBB, OF MILWAUKEE, WISCONSIN, ASSIGNOR TO KOEHRING COMPANY, OF MILWAUKEE, WISCONSIN, A CORPORATION.

ROTARY DISCHARGE CHUTE.

Application filed March 27, 1926. Serial No. 97,963.

This invention has relation to a certain type of discharge chute for concrete mixing machines, in which the chute means, in addition to performing its discharging function, enters into the mixing function of the mixing machine by cooperating as a mixing element when not being utilized to do its discharge work. A construction of such double function chute is illustrated in the patent of Philip A. Koehring, #899,414, issued September 22, 1925, said patent showing a discharge and mixing chute which pivots for movement about a horizontal axis at substantially right angles to the mixing drum with which it is associated.

In the design of chute which I have developed as my present invention, a rotary structure is used wherein the chute means comprises a supporting means which is mounted substantially concentric with the axis of the drum so that the chute supported thereby may be turned about said axis to a position in which said chute performs a mixing function, and to a reversed position to which it may be rotated, said chute performing a discharging function for the mixing drum.

So far as I am aware, it has not been proposed heretofore to use a chute, or rotative combined mixing and discharge device, for obviously where a device such as suggested is employed it does the work, practically speaking, of two different devices, i. e., the usual discharge chute, and a remixing element that is a part of the mixing function of the concrete mixing mechanism. In doing its mixing work the discharge device or chute is capable of directing the aggregates back from the discharge end of the mixing drum to the opposite end of the latter.

In addition to the foregoing, my invention involves a novel chute or discharge structure that possesses self-operating functions, so to speak, because by reason of the method of handling the aggregates in the mixer, the said aggregates may be employed to act on the discharge means with peculiarly directed impact forces that are adapted to actually move or operate the said means to shift it from one position to another.

This important feature of my invention resides in the peculiar formation of the chute whereby it is provided with side or wing members assisting to direct the falling mixed materials into the chute for discharge or for remixing, as the case may be, the said side or wing members on the chute being so arranged that the falling materials act with pressure forces or impact action against the side or wing which happens to be in the path thereof, thus tending to rotate the chute about its axis, either to bring it to a discharging position or to an inoperative position, or to a mixing position, if, when it is inoperative to discharge, it acts to do mixing work.

Under these conditions, I am enabled to turn the chute from its discharging to its mixing position, and reverse these positions as well, by the expenditure of no manual or mechanically applied forces, and with the use of much reduced power if the machine is exceptionally large. The last described self-propelling action may be availed of whether the chute is merely a discharge device or has both discharging and mixing functions.

This is a factor of much importance in very large mixers in which the falling mixing materials are exceedingly heavy and require the application of great force not only to enable the turning of the chute itself, by reason of its own weight, but additional force because of the resistance offered by the falling materials to any moving adjustment of the chute. The greatly increased power necessary for these operations of my invention applied to ordinary mixers of today, has been one of the initiating causes for my evolving my invention herein.

My invention involves additionally, a specific form of chute body and a peculiar form of stationary chute associated therewith, involving guard means, together with a special mounting of the said parts in relation to a splash plate provided at the discharge opening of the mixing drum.

In the accompanying drawings:—

Figure 1 is an end view of the mixing machine showing particularly the mixing drum thereof and illustrating the parts on the section 1—1 of Figure 2.

Figure 2 is a transverse sectional view through the drum and the discharge devices.

Figure 3 is a side view of the discharge and mixing chute illustrating the same detached and located in its mixing position.

Figure 4 is a sectional view through the discharge chute taken on the line 4—4 of the Figure 2.

Figure 5 is a sectional view of the invention taken about on the line 5—5 of Figure 2.

Figure 6:
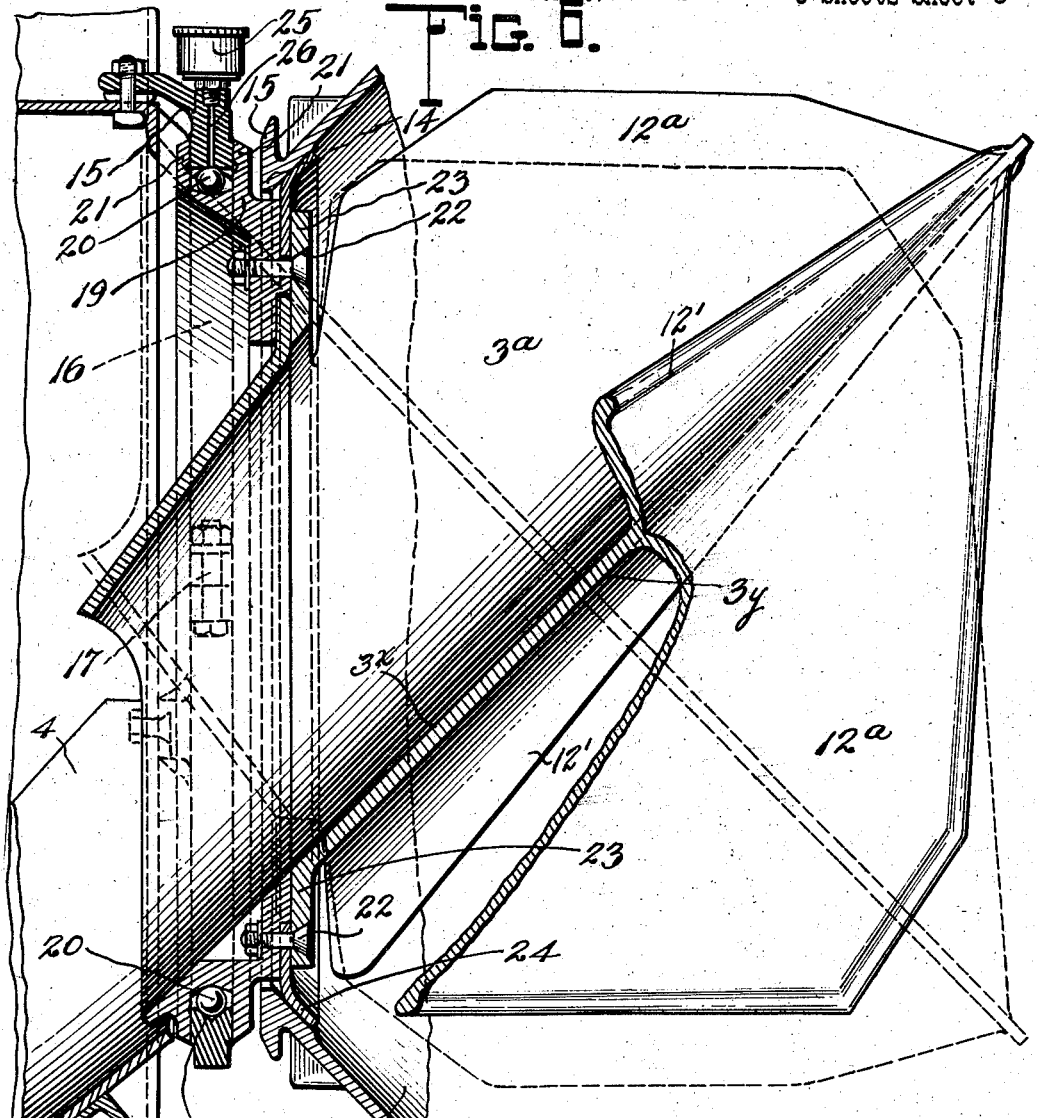
Figure 6 is a sectional view showing a modified adaptation of the invention.
Figure 7:
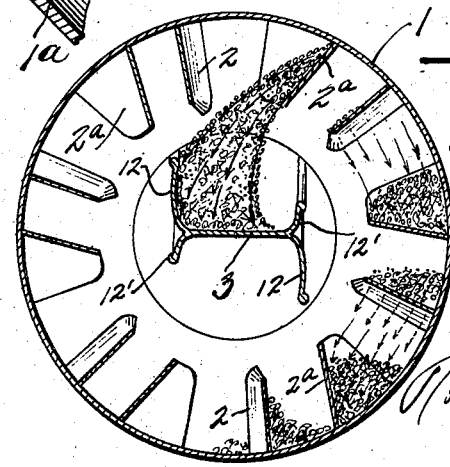
Figure 7 is a sectional view bringing out more clearly the manner in which the impact forces of the aggregates raise and drop by agitation in the mixer and are directed against the wings or sides of the chute.

Describing my invention specifically, and referring to the accompanying drawings, 1 denotes the mixing drum of the rotary concrete mixing mechanism, the said machine being equipped with interior blades 2, and lifting buckets $2^a$ by which the materials that are being mixed are agitated and lifted and dropped during the rotation of the drum 1.

The mixing drum 1 is mounted on a suitable frame work, after the known manner, and its construction need not be further detailed. Usually a drum of this type is provided with a charging opening at one end, and at its opposite end is located the discharge opening which is illustrated in the drawings herewith, in conjunction with the movable discharge chute 3 and stationary discharge chute 4.

The movable discharge device or chute 3 may be supported at the discharge opening of the drum for free rotating movement by different means than that first to be described as one type comprising a trunnion or axis member 5 journaled in a suitable bracket 6 which is supported by the frame work 7 of the machine. The trunnion 5 is provided with an integral hollow arm 8 projecting inwardly therefrom, as seen best in Figure 3, and formed with this arm 8 is the chute body 3 aforesaid. The parts may be an integral casting if desired, and the chute 3 is disposed in a position oblique with respect to the axis of the trunnion 5 and the axis of rotation of the drum 1. In other words, the chute 3 is inclined inwardly and downwardly in relation to the axis 5 so that when said chute is in the position of Figure 2, its discharge position, it will receive thereon the materials mixed in the drum 1 and lifted by the buckets 2 from which said materials drop down on the discharge position $3^x$ of the chute 3. The form of the chute is particularly novel in respect to the fact that its body is oblique to the axis of the drum, both when the chute is acting as a discharge, and when it is turned to a position preventing discharge of concrete from the drum. In the latter position, its oblique relation to the drum causes it to assume a condition of inclination opposite that above mentioned, cutting off discharge. Moreover, it is notable that the chute has a long body, in fact its length causes it to be interposed in the path of the falling aggregates. On this account, when the chute 3 is reversed to the dotted line position of Figure 2, it becomes a part of the mixing function of the drum 1 and parts 2 and $2^a$, for the materials falling thereon will be carried back to the entering end of the drum and remixed by sliding down the remixing portion $3^y$ thereof. This double action of a rotary chute is a broad phase of this invention.

As seen best in Figure 2, the point at which the hollow arm 8 joins the chute body 3 is made somewhat in the form of an annulus 9 provided with an external groove in which is received a splash plate 10 that closes the discharge opening of the drum 1 at the point surrounding the outer end of the discharge chute. The splash plate 10 may be fastened by bolts or like fastenings to the drum 1 at the flaring mouth plate 11 of the latter.

Passing now to another feature of importance of the invention, I make the discharge chute 3 with side members or impact wings 12, seen best in Figure 4. One of these wings or side members 12 is provided at each side of the chute, the two wings extending in opposite directions at diagonally opposite points, one downwardly and one upwardly, when the chute is in either of its two operating positions. By operating positions, I mean, one position in which the chute discharges by use of discharge portion $3^x$, and another position in which the chute forms a mixing element and is inoperative to discharge, at which time the mixing portion $3^y$ is employed.

The sides or members 12 on the chute 3 are located at opposite side edges thereof, as well as extending in opposite directions, and these members are especially located for peculiar cooperation with aggregates received from the lifting buckets $2^a$ and blades 2, see Figure 5. In other words, when either of the members 12 is uppermost it is so located in respect to the buckets 2 that the aggregate materials which cascade or drop from the buckets $2^a$ onto the chute 3 are delivered with head or force directed against the inside of the wing or side member 12 uppermost. Said materials, therefore, will rotate or tend to turn the chute 3 in a contra-clockwise direction according to the illustration, the same being the direction of rotation of the mixer drum 1. Under these conditions it will be evident that considerably less power, or no power, may be required for turning the chute 3 in a rotary manner, though by means of a handle 5' seen in Figure 3 on the trunnion 5, manual or other power may be applied to turn the chute if desired. Shallow flanges 12' are located opposite to each wing 12 to facilitate pouring of the aggregates along the portions 3ˣ and 3ʸ.

It is notable that in cooperation with the chute 3 I use the stationary chute 4 previously referred to and said chute 4 is preferably provided at its inner end with an upward extension 4ᵃ having a pivoted top plate 4ᵇ pivoted at 4ᶜ. The upward extension 4ᵃ of the stationary chute 4 houses the arm 8 and tends to prevent the lodgment upon this portion of the chute operating means, of concrete plastic or similar materials that may be operated upon in the mixing drum 1. To lock the chute 3 from rotation, or stop its revolution, I may use the handle actuated lock means A coacting with pins B on the chute 3.

Reference is now made to Figure 6, illustrating a modification of my invention, wherein I provide a different mounting for the rotary chute from that illustrated in Figures 1 to 5 inclusive. In this construction of Figure 6 the drum discharge opening is designated 14 and is surrounded by the usual flange 15.

The chute of the modified construction is designated 3ᵃ and its wings 12ᵃ. The said chute is carried by the frame work 7ᵃ of the machine by providing on said framework a supporting bracket or brackets 15, carrying a circular frame 16 made preferably in two or more sections, bolted together externally by clamping bolts 17. The circular frame part 16 is provided interiorly thereof with a ball race 18, between which and a supporting plate 19, attached to the chute 3ᵃ, are anti-friction ball bearings 20. The supporting plate 19 is formed with spaced annular flanges 21 adapted to receive therebetween the circular frame member 16, the parts fitting snugly together, and maintained in supporting relation by the innerlocking action of the flanges 21 upon the supporting frame 16. The supporting plate 19 is thus freely rotatable in relation to the frame member 16, and said plate 19 at its inner-portion is bolted at intervals as by bolts 22 to the annular flange 23, which surrounds the chute.

The said fastening bolts 22, in addition to attaching the body of the chute 3ᵃ to the supporting plate 19, also secure to the flange 23 a resilient guard member 24 that forms a seal between the chute structure and the discharge opening of the drum 1ᵃ.

By reason of the foregoing arrangement, it will be apparent that my chute 3ᵃ is wholly supported exteriorly of the drum 1ᵃ, the bearings between the chute support plate 19 and the circular frame 16 being wholly outside of the drum and therefore somewhat remote from the space in which the aggregates are located.

The brackets 15 may be equipped with grease cups 25 at the grease openings 26 so as to readily lubricate the bearings 20 in a self-evident manner, and the lubrication is effectively retained in the bearing spaces by the construction proposed.

The resilient member 24 constitutes a splash plate device corresponding to the similar part 10, previously described.

It will be understood that in accordance with my invention, I am not necessarily restricted to the use of the mixing construction or function of the chute 3 as my invention would be of practical value for mixing drum discharge purposes independently of said function.

Matters of invention disclosed herein, but not claimed, are claimed in my copending applications, one covering "discharge mechanism for concrete mixers," filed Mar. 27, 1926, Serial #97,962, and the other covering "concrete mixing machines," filed Sept. 25, 1926, Serial No. 137,665.

Having thus described my invention, what I claim as new and desire to cover by Letters Patent, is:

1. In a mixing machine, in combination, a mixing drum provided with a discharge, means within the drum for elevating and dropping materials mixed by the drum, a discharge chute associated with the discharge of the drum and comprising a rotative body provided with means to receive, in the direction of rotation of the body, the impact of the materials elevated by the drum and dropped therein, whereby the turning of the chute is facilitated by said impact action.

2. In a mixing machine, in combination, a mixing drum provided with a discharge, means within the drum for elevating and dropping materials mixed by the drum, a discharge chute associated with the discharge of the drum and comprising a rotative body provided with means to receive, in the direction of rotation of the body, the impact of the materials elevated by the drum and dropped therein, whereby the turning of the chute is facilitated by said impact action, the said chute inclining from the upper portion of the drum outwardly in performing its discharge function, and when turned to render such discharge function inoperative inclining from the discharge of the drum downwardly and inwardly.

3. In combination, a mixing drum having lifting buckets for elevating and dropping materials during rotation of the drum, the said drum having a discharge opening, a rotary chute mounted at said discharge opening and extending into the drum to receive thereon the materials dropped in the drum by said buckets, means whereby the chute may be turned from a discharging position to a reversed non-discharging position, and means on the chute for receiving the impact of the dropping materials elevated by the buckets of the drum so that the impact action sets up a turning force tending to rotate the chute to reduce the power necessary for this purpose.

4. In combination, a mixing drum having lifting buckets for elevating and dropping materials during rotation of the drum, the said drum having a discharge opening, a rotary chute mounted at said discharge opening and extending into the drum to receive thereon the materials dropped in the drum by said buckets, means whereby the chute may be turned from a discharging position to a reversed non-discharging position, and means on the chute for receiving the impact of the dropping materials elevated by the buckets of the drum so that the impact action sets up a turning force tending to rotate the chute to reduce the power necessary for this purpose, said impact receiving means on the chute being located at opposite sides thereof so that the impact action will take place when the chute is in its discharging position, and when it is reversed so as to resume a non-discharging position within the drum.

5. In combination, a mixing drum having lifting buckets to elevate and drop materials within the drum when said materials are being agitated, the said drum having a discharge opening concentric with its axis, a rotary chute mounted at said opening and comprising an inclined body extending within the drum in a direction oblique with respect to the axis of the latter, means whereby said chute may be rotated to carry it from a position in which it inclines from the discharge opening downwardly toward the lower portion of the drum, and impact receiving wing members projecting from opposite sides of the chute to receive the impact force of dropping materials in the drum in a manner tending to rotate the chute to facilitate turning adjustments thereof.

6. In a mixing machine, in combination, a mixing drum provided with a discharge, means within the drum for elevating and dropping materials mixed by the drum, a discharge chute associated with the discharge of the drum and comprising a rotative body provided with means to receive the impact of the materials elevated by the drum and dropped therein, whereby the turning of the chute is facilitated by said impact action, and a splash plate device at the discharge of the drum surrounding the chute, said splash plate occupying the space between the chute and the discharge substantially as described.

7. In a mixing machine, in combination, a rotating drum, a rotative discharge chute associated therewith, a mounting means between the drum and discharge chute comprising a supporting frame member externally of the drum, and a supporting plate carried by the chute and having spaced flanges rotatively enclosing said frame member.

8. In a mixing machine, in combination, a rotating drum, a rotative discharge chute associated therewith, a mounting means between the drum and discharge chute comprising a supporting frame member externally of the drum, a supporting plate carried by the chute and having rotative connection with said frame member, the said supporting plate comprising spaced flanges receiving the said frame member therebetween, and anti-friction bearings between the plate and the frame member.

9. In a mixing machine, in combination, a mixing drum having a discharge opening, a rotative chute mounted in said discharge opening and provided with a surrounding supporting plate arranged externally of the drum and provided with a bearing raceway, and a supporting frame element surrounding said plate and having a cooperating bearing raceway, anti-friction bearings for said raceways, and means arranged inward of the raceways engaging the drum to close the discharge opening thereof about the chute.

10. In a mixing machine, in combination, a mixing drum having a discharge opening, a rotative chute mounted in said discharge opening and provided with a surrounding supporting plate arranged externally of the drum and provided with a bearing race, and a supporting frame element surrounding said plate and having a cooperating race, anti-friction bearings carried in said races, the said supporting plate, and a resilient splash plate device carried by the supporting plate aforesaid and extending therefrom into engagement with the drum for closing the discharge opening of the latter at the space between the chute and the drum.

11. In a mixing machine, in combination, a mixing drum having agitating means for lifting and dropping aggregates mixed therein, a discharge device having a discharge portion and a mixing portion and arranged to extend into the mixing zone of the mixer so that the aggregates agitated therein will fall thereupon, the said discharge device being movable to bring its discharge portion into action to discharge the contents of the drum, and additionally movable to render its mixing portion operable for cooperation with the drum agitating means for mixing the aggregates therein, and means on the discharge device formed and located for receiving the impact of falling aggregates to be moved thereby.

12. In a mixing machine, in combination, a mixing drum having agitating means therein for raising and dropping aggregates to be mixed thereby, a device mounted in association with the drum and comprising separate discharge and mixing portions projecting into the mixing zone of the mixer, and a mounting means for said device whereby it may be moved to one position so that its discharging portion is operative, and then moved into another position to bring its mixing portion into operative location.

13. In a mixing machine, in combination, a mixing drum having agitating means therein for raising and dropping aggregates to be mixed thereby, a device mounted in association with the drum and comprising separate discharge and mixing portions projecting into the mixing zone of the mixer, and a mounting means for said device whereby it may be moved to one position so that its discharging portion is operative, and then moved into another position to bring its mixing portion into operative location, the discharge and mixing portions of said device being located at opposite sides thereof.

14. In a mixing machine, in combination, a mixing drum having agitating means therein for raising and dropping aggregates to be mixed thereby, a device mounted in association with the drum and comprising separate discharge and mixing portions projecting into the mixing zone of the mixer, and a mounting means for said device whereby it may be moved to one position so that its discharging portion is active, and then moved into another position to bring its mixing portion into operative use, the discharge and mixing portions of said device being located at opposite sides thereof, the mounting means for the said device comprising parts whereby the device may be rotated to alternately render operative its discharging and mixing portions.

15. In a concrete mixing machine, in combination, a mixing drum having agitating elements therein for raising and dropping concrete aggregates mixed thereby, a rotary device mounted in cooperation with said drum and projecting into the zone of the falling aggregates operated upon in the drum, said rotary device being provided with two operating portions, namely a discharge portion and a separate mixing portion, adapted to be alternately moved into operative position by rotation of the device.

16. In a concrete mixing machine, in combination, a mixing drum having agitating elements therein for raising and dropping concrete aggregates mixed thereby, a rotary device mounted in cooperation with said drum and projecting into the zone of the falling aggregates operated upon in the drum, said rotary device being provided with two operating portions, namely a discharge portion and a separate mixing portion, each adapted to be moved into an operative position by rotation of the device, the said discharge portion and mixing portion being provided with an impact member to receive the impact forces of aggregates gravitating upon said device.

17. In a concrete mixing machine, in combination, a mixing drum having agitating elements therein for raising and dropping concrete aggregates mixed thereby, a rotary device mounted in cooperation with said drum and projecting into the zone of the falling aggregates operated upon in the drum, said rotary device being provided with two operating portions, namely a discharge portion and a separate mixing portion, each adapted to be moved into an operative position by rotation of the device, the said discharge portion and mixing portion being provided with an impact member to receive the impact forces of aggregates gravitating upon said device, mounted means supporting the said rotary device for rotation, and means for holding the rotary device locked in a position in which either of its discharging and mixing portions is active.

18. In a concrete mixing machine, in combination, a rotary drum having agitating elements to lift and drop aggregates mixed therein, and a rotatable chute mounted in cooperation with the drum and comprising separate discharging and mixing portions entering the drum and arranged in the mixing zone of said drum, with means to turn the chute so that either the discharging portion or the mixing portion is uppermost and operative.

19. In a concrete mixing machine, in combination, a rotary drum having agitating elements to lift and drop aggregates mixed therein, and a rotation chute mounted in cooperation with the drum and comprising separate discharging and mixing portions extending into the drum and arranged in the mixing zone of said drum, with means to turn the chute so that either the discharging portion or the mixing portion is uppermost and operative, said turning means including an impact wing carried by each of the discharging and mixing portions and adapted to be acted upon by the gravitating aggregates in the drum.

20. In a mixing machine, in combination, a rotary mixing drum having agitating means for lifting and dropping aggregates mixed therein, a discharging and mixing device cooperating with said drum, and impact means carried by said device to receive impact forces of the agitated contents of the drum for shifting the said device to render its discharging portion or its mixing portion operative.

21. In a concrete mixing apparatus, the combination, with a mixing container, of a shiftable chute adapted to be shifted from a discharging position to a mixing position relative to said container, and means for causing aggregates being mixed in said container to act upon the chute for tending to shift the same.

22. In a concrete mixing apparatus, the combination, with a mixing container, of a shiftable chute adapted to be shifted from a discharging position to a mixing position relative to said container, and means for causing aggregates being mixed in said container to act upon the chute for shifting the same.

23. In a concrete mixing apparatus, the combination, with a mixing container, of a rotatably mounted chute adapted to be rotated from a discharging position to a mixing position, and means for causing aggregates being mixed in said container to act upon the chute for rotating the same.

24. In a concrete mixing apparatus, the combination, with a mixing drum, of a chute shiftably mounted to move angularly substantially about the axis of rotation of the drum to assume a position of discharge relative to the drum or a position for mixing aggregates within the drum, said chute being located and shaped for receiving the impact of falling aggregates within the drum and for changing the course of the descending stream of such aggregates.

25. In a concrete mixing apparatus, the combination, with a mixing drum, of a chute shiftably mounted to move angularly substantially about the axis of rotation of the drum to assume a position of discharge relative to the drum or a position for mixing aggregates within the drum, said chute being located and shaped for receiving the impact of falling aggregates within the drum and for changing the course of the descending stream of such aggregates and directing said stream toward the entering end of the drum.

26. In a concrete mixing apparatus, the combination, with a mixing drum, of a chute rotatably mounted to move between a discharging position and a concrete mixing position, and means on the chute for receiving the impact of falling aggregates within the drum and varying the course of such aggregates and distributing the stress of such impact in the direction of rotation of the chute.

27. In a concrete mixing apparatus, the combination, with a mixing drum, of an invertable chute shaped to discharge aggregates from the drum when one side is uppermost and to aid in mixing of aggregates when the other side is uppermost, and a splash plate for the chute disposed to receive the impact of falling aggregates within the drum and to apply the stress thereof in a direction tending to invert the chute.

28. In a concrete mixing apparatus, the combination with a mixing drum, of a rotatably mounted chute adapted to assume a position for discharging material from the drum and to be inverted to a position for mixing material within the drum, and splash plates on said chute adapted to receive the impact of falling aggregates within the drum and apply the stresses thereof in a direction tending to cause rotation of the chute.

29. In a concrete mixing apparatus, the combination, with a mixing drum having a discharge opening, of a discharge chute for the drum, means sealing the area between the chute and drum, and means outward of the sealing means for rotatively sustaining the chute.

30. In a concrete mixing apparatus, the combination, with a mixing drum having a discharge opening, of a rotary chute mounted at said opening and provided with an annular flange forming a closure for said opening, and a resilient part carried by said chute and engaging the drum to establish non-leaking connection between the chute and drum.

31. In a concrete mixing apparatus, the combination, with a rotary drum having a discharge opening, of a rotary chute mounted at said opening and having an annular flange forming a closure for said opening, and a resilient part carried by said chute and engaging the inner portion of said drum for establishing non-leaking connection between the drum and chute.

32. In a concrete mixing apparatus, the combination, with a mixing drum having means therein for elevating and dropping aggregates, of a chute associated with the drum and having separate discharge and mixing portions extending into the mixing zone of the drum, said chute having an outstanding part additional to the discharge portion to assist in the mixing action when in mixing position, and mounting means for said chute whereby the chute may be moved from a discharging position to a mixing position and return.

33. In a concrete mixing apparatus, the combination, with a movably mounted container having a discharge opening, of a discharge chute having a substantial non-leaking engagement with the container about said discharge opening, said chute being mounted to move relative to the container and also with the container and being adapted to be stopped in its motion in position for closing said discharge opening.

34. In a concrete mixing apparatus, the combination with a mixing drum having means for elevating and dropping aggregates therein, of means for drawing and applying power from the aggregates falling within said drum.

35. In the art of mixing concrete aggregates, elevating and dropping the aggregates for intermingling same, and delivering power from said aggregates incident to descent thereof on being dropped.

36. In a concrete mixing apparatus, the combination, with the concrete mixing means adapted to elevate and drop aggregates in the course of mixing the same, and means interposed in the path of descending aggregates for utilizing the power thereof.

In testimony whereof I affix my signature.

GEORGE E. WEBB.